Figure 5:
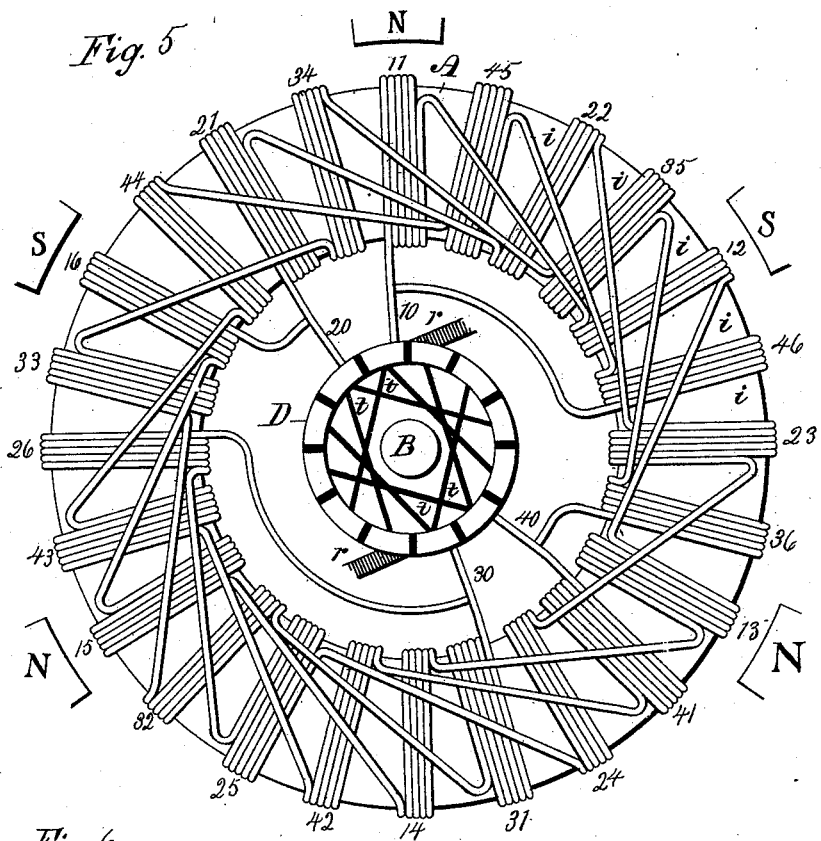

(No Model.) 3 Sheets—Sheet 1.
J. G. POOL.
RING ARMATURE.
No. 468,690. Patented Feb. 9, 1892.
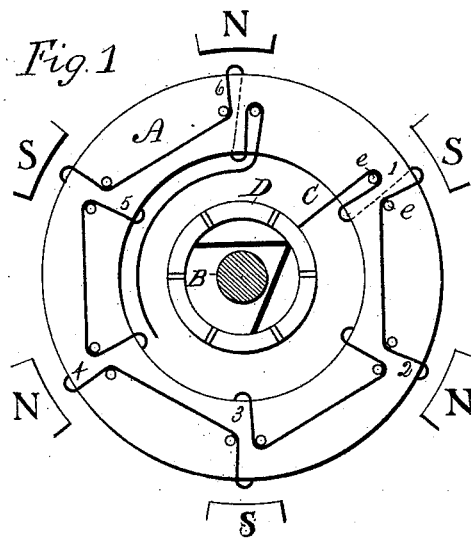
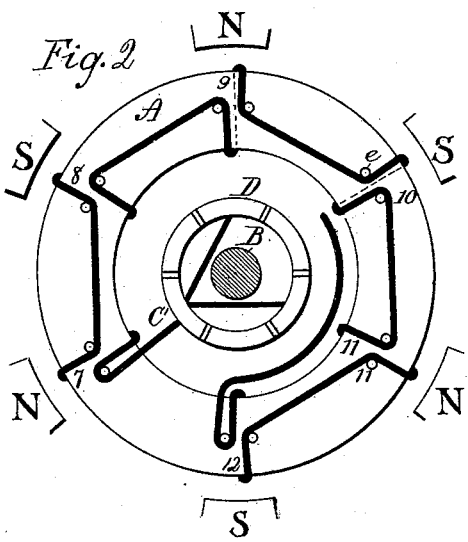
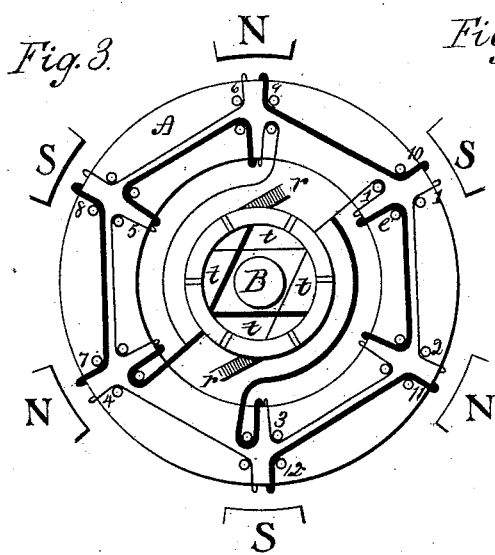
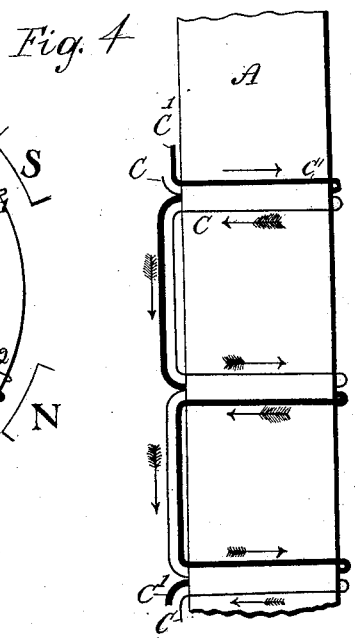
Witnesses:
Chas. B. Shumway
Willard C. Warren.
Inventor
John George Pool
By George L. Barnes
Atty.
THE NORRIS PETERS CO., PHOTO-LITHO., WASHINGTON, D. C.

(No Model.)  3 Sheets—Sheet 2.

J. G. POOL.
RING ARMATURE.

No. 468,690.  Patented Feb. 9, 1892.

Witnesses:
Chas. B. Shumway
Willard C. Warren.

Inventor
John George Pool
By George L. Barnes
Atty.

(No Model.) 3 Sheets—Sheet 3.

J. G. POOL.
RING ARMATURE.

No. 468,690. Patented Feb. 9, 1892.

Witnesses:
Chas B. Stemmway
Willard C. Warren.

Inventor
John George Pool
By George L. Barnes
Atty.

UNITED STATES PATENT OFFICE.

JOHN GEORGE POOL, OF NEW HAVEN, CONNECTICUT, ASSIGNOR, BY DIRECT AND MESNE ASSIGNMENTS, OF THREE-FOURTHS TO HIMSELF, JOSEPH E. HOBINGER, AND NICHOLAS W. HOBINGER, OF SAME PLACE.

RING-ARMATURE.

SPECIFICATION forming part of Letters Patent No. 468,690, dated February 9, 1892.

Application filed September 7, 1891. Serial No. 405,038. (No model.)

*To all whom it may concern:*

Be it known that I, JOHN GEORGE POOL, a citizen of the United States, residing at New Haven, in and county of New Haven and State of Connecticut, have invented certain new and useful Improvements in Ring-Armatures, of which the following is a specification.

My invention relates to an improvement in closed-circuit ring-armatures for multipolar dynamos and electrical motors. In ordinary multipolar dynamos having ring-armatures the wire is wound upon the body of the ring in a single direction or continuous coil, which is divided into separate series of coils by the poles of the fields, said series being connected through the brushes in multiple arc. As in the case of batteries in which the separate cells are connected in multiple arc, the tension of the resulting current or the electro-motive force is only that of a single cell. So in the said ordinary system of ring-armature winding, in which the several series of coils are connected in multiple arc, the electro-motive force or tension of the induced current is that of a single elementary series only, the total number of coils affecting only the total quantity of current produced, but not superadding the tension of the several elementary coils.

The object of my invention is to provide a ring-armature having its conductors joined in series connection throughout the respective halves of the circuit of the armature, whereby the electro-magnetic current induced will be intensified or increased in electro-motive force correspondingly with the number of elementary coils in a half-circuit of the armature, the tension of the coils being superadded and a current of high electro-motive force being induced analogously to the accumulation of tension in the current of a galvanic battery in which the individual cells are joined in series instead of multiple arc.

The invention consists in a ring-armature having its wire conductors joined in an endless or closed circuit, the successive coils of which are alternated or wound around the section of the ring in opposite directions and arranged at intervals or radial spaces apart on the ring corresponding to the distances between neutral points of adjacent poles of the field-magnets, the corresponding coils of successive cycles or sub-series of conductors being wound in uniform precession or recession covering a range or interval of two field-spaces of opposite polarity, with commutator connections corresponding to the said sub-series, whereby the active wires are extended in opposite directions under poles of opposite polarity, and thereby joined in series connection throughout the respective halves of the circuit, as hereinafter more fully described and claimed.

Figure 6:
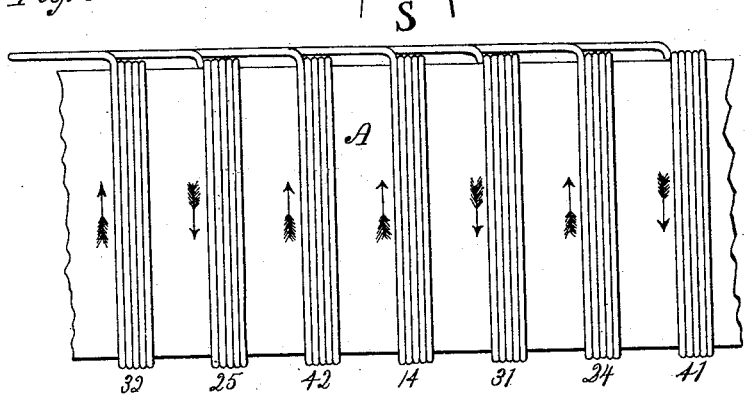
Figure 7:
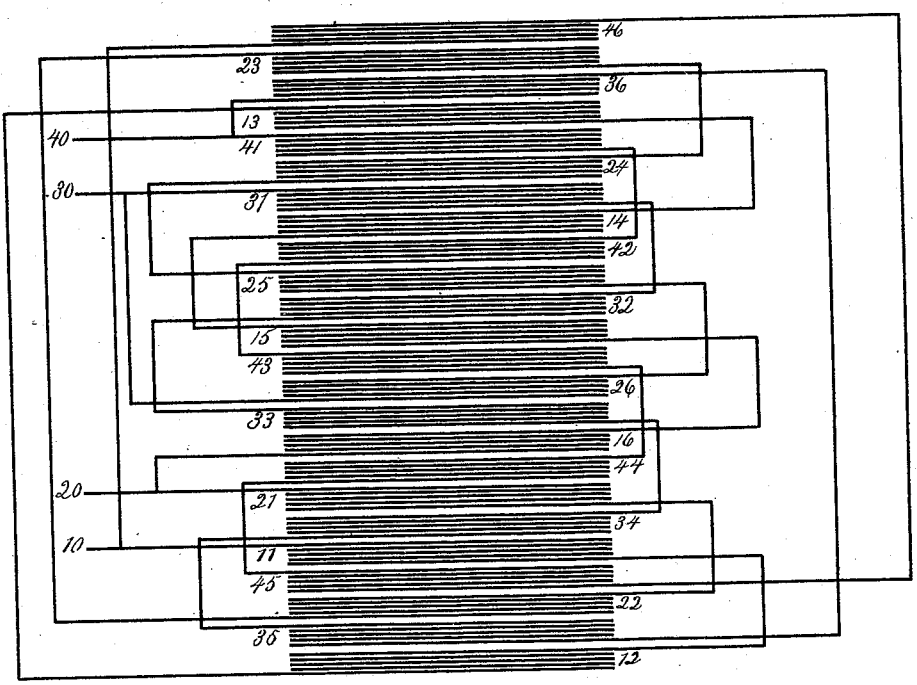

In the accompanying drawings, forming a part of this specification, Figure 1 is a diagram representing a ring-armature having a single cycle or sub-series of elementary coils wound upon it in series connection to form a half-circuit of conductors in accordance with the principles of my improved system of winding ring-armatures, the ring being shown in end elevation. Fig. 2 is a similar diagram representing the winding of the opposite half-circuit or complement of the half-circuit of coils shown in Fig. 1. Fig. 3 is a diagram representing the respective halves of a circuit of coils, as shown in Figs. 1 and 2, combined to form a complete closed circuit of elementary coils with opposite or positive and negative commutator connections for the inflow and outflow of the electric current, said connections being adapted to join the respective halves of the circuit of coils in multiple arc through suitable and ordinary brushes. Fig. 4 represents a portion of the periphery of the armature shown in Fig. 3 as developed on a plane surface. Fig. 5 is an end view of a ring-armature wound with a series of cycles of elementary coils on my improved system as practically constructed for operation. Fig. 6 is a plane development of a portion of the periphery of the armature shown in Fig. 5. Fig. 7 is a plane development of an armature, showing a modification of the method of connecting the coils.

Referring to the drawings, the peculiar manner of winding a ring-armature in my improved system is shown in Figs. 1 to 4, inclusive, in which A represents an annular or ring armature adapted to revolve, with its shaft B, in the fields of the stationary electro-magnets N and S, which letters respectively denote the north and south poles of the magnetic system. It will be understood that any desired number and form of magnets may be employed and that the armature-ring may be constructed in any well-known manner, my invention relating wholly to the arrangement of the conductors thereon or the armature-winding. The ring may be fastened to the shaft in any well-known manner, and the shaft may be journaled in the usual bearings, here requiring neither to be shown or described.

In Fig. 1, C represents a wire, which, beginning at any of the commutator-segments D, is wound around the section of the armature-ring A in one or more turns, one being sufficient for purposes of explanation. Suitable pins e are represented as retaining the wire in position, as shown. A coil 1 being thus formed, the wire is led along on the ring over a space corresponding to the distance between the neutral points of the field-magnets, and a coil 2 is there formed around the section of the ring, but wound in the opposite direction—that is, if in the first coil the wire is led from the holding-pin inward in starting to wind it will be led outward in starting to wind the second coil, so that the direction in which the wire runs along the periphery of the ring will be reversed in the said coils, as shown in Fig. 4, and thus the currents induced therein by passing the said coils under adjacent magnetic poles of opposite polarity will therefore be in the same direction along the wire, and consequently accumulative. Proceeding over a further interval corresponding to the space between adjacent neutral points of the field a third coil 3 is formed similar to the first, and successive coils 4, 5, and 6 are formed in similar order, which complete a single cycle or sub-series of coils corresponding in number to the poles of the machine, all joined in series connection, the induced current through the wire being all in the same direction, and therefore accumulative, for if the current is induced in a given direction in the coils 1, 3, and 5 under the south poles of the field it will be induced in the same direction in the reversed coils 2, 4, and 6 under the opposite or north poles. Commencing at a position on the armature in a point of equal intensity, but of opposite polarity from the first coil 1—that is, near the position of one of the coils 2, 4, or 6—a second wire C', starting from the commutator, is wound around the ring in the same direction and similarly to the first coil 1, forming a coil 7, as shown in Fig. 2. The wire is then led along the ring in the same direction in which it was led in the first cycle of coils (shown in Fig. 1) to a point distant from coil 7 equal to the space between adjacent neutral lines of the field-magnets, and a coil 8 is there wound in the opposite direction from coil 7, and so successive coils are wound alternately in opposite directions at corresponding distances apart until a cycle of coils 7 to 12, inclusive, is formed equal in number and adjacent to the coils of the first cycle and connected in series, the last end of the wire of the last cycle being connected to the first end of the wire of the first cycle and the last end of the wire of the first cycle being connected to the first end of the wire of the last cycle, as shown in Fig. 3. These two cycles of coils then form a complete closed circuit of coils, the respective halves of which are the said opposite cycles connected through the brushes and commutator in multiple arc. Although the second cycle is wound in the same direction as the first cycle, adjacent coils of the respective cycles will be wound in opposite directions, as shown by the arrows in Fig. 4, because the cycles are started in fields of opposite polarity, and therefore the induced current in the last cycle will be in the reverse direction from the flow of the current in the first cycle, and a continuous current will thus be maintained throughout the system, flowing inward through one of the commutator connections and outward through the other, the brushes, as heretofore stated, connecting the respective halves of the circuit. A dynamo having its conductors limited to two cycles or sub-series only would be unserviceable; but to whatever extent the cycles are increased the principle of action remains the same.

In the construction of a practical machine the method of arranging the conductors of the armature is as follows, as shown in Fig. 5, in which there are four cycles of coils represented. The coils 11 to 16, inclusive, forming the first cycle, are arranged as set forth in the foregoing description relating to Fig. 1, a commutator connection 10' being made at the first coil 11. A similar sub-series of coils in continuation of or series connection with the first cycle is formed, the coils of which, 21 to 26, inclusive, are placed in regular precession or recession from the corresponding coils of the first cycle, with a corresponding commutator connection 20 adjacent to the first commutator connection 10. In like manner successive cycles of coils are wound until the required number of cycles or sub-series in a half-circuit are provided, two cycles only being here shown to avoid complicity; but whatever number of cycles are employed their corresponding coils will be equally divided over a space or interval corresponding to the distance between adjacent neutral points of the fields. Then, commencing in a space between adjacent neutral points having opposite polarity to the space in which the coils of the first half of the circuit are commenced, a similar series of cycles of coils is wound comprising the coils 31 to 36 and 41 to 46, inclusive, in Fig. 5, with corresponding commutator connections 30 and 40. The coils of the armature being wound, they are connected together, preferably by outside connecting-wires i, suitably joined to the coils and adapted to connect them in the numerical order shown, coil 11 being connected to coil 12, coil 12 to coil 13, &c.—that is, each coil is connected to other coils distant therefrom equal to the intervals between neutral points of the field—and when so connected each connecting-wire $i$ will cross over as many intermediate coils as there are cycles or sub-series in the circuit minus one. Thus in the figure each wire $i$ skips three intermediate coils and joins the first and fifth coils throughout the circuit in accordance with the principles defined in Figs. 2 and 3, whereby all the coils will be joined in a continuous closed circuit, as shown. This mode of connecting the coils brings all the connecting portions of wire on the outside of the coils, where they are readily accessible. The direction of the induced current in cycles of coils 31 to 46 and commutator connections 30 and 40 will be in the reverse direction from the current in the coils 11 to 26, inclusive, and commutator connections 10 and 20, and the brushes, as before explained, will connect said respective halves of the circuit in multiple arc; but all the coils in each half will be connected in series and the electro-motive force will be accumulative throughout an entire half of the circuit of the armature and will correspond in intensity to the intensity of a single coil multiplied by all the coils in such half of the circuit. If desired, each alternate connection $i$ may be placed on the opposite side of the ring, and in such case the wires will be arranged in effect substantially as shown in Fig. 7. It will be understood that the armature should be wound with the coils compactly placed close together, as shown in Fig. 7, filling the armature, and they will then require no pegs or grooves to keep them in place. It is immaterial whether the coils are all placed side by side or some over or lapped upon the others, as usual in winding ordinary armatures, if they are properly connected in accordance with the principles hereinbefore set forth. It is not necessary that the positive and negative commutator connections shall be placed opposite each other if they are only arranged in fields of opposite polarity. Thus the connections 30 and 40 may be made at coils 33 and 43 or 35 and 45, or the connections 10 and 20 may be made at coils 13 and 23 or 15 and 25. If connections 30 and 40 are placed at coils 33 and 43, the continuity of the first and second halves of the winding will be more apparent, and it will be seen that the last half of the circuit is simply the extension of the winding as commenced until in the precession or recession of the corresponding coils of the sub-series or cycles they are distributed over two adjacent spaces of the fields, the opposite polarity of which divides the circuit into halves, which are in fact connected through the brushes in multiple arc. The number of commutator-bars in this construction will equal the number of cycles or sub-series of coils multiplied by the number of magnetic fields. For instance, in the illustration Fig. 5, in which there are six poles, the number of fields is three, which multiplied by the number of cycles, or four, equals twelve, the number of commutator-bars.

In order to take off the current, two brushes $r$, positive and negative, may be placed at opposite points on the commutator, the commutator-bars being suitably connected by cross-wires $t$, as shown in Fig. 5, in which the first bar, commencing at any point in the commutator, is connected with the fifth and ninth bars therefrom, the second bar is connected with the sixth and tenth bars, the third bar with the seventh and eleventh bars, and so on around the entire circle, each set of connected bars comprising as many equidistant bars as there are magnetic fields. By this means connections will be made with the brushes $r$ in each field and the circuit kept intact throughout the entire revolution.

I claim—

1. The combination, with an annular or ring armature core, of a series of conductors or wire coils wound around the section of the ring and connected in endless or closed circuit, with the successive coils alternated or wound in opposite directions and arranged at intervals or radial spaces apart on the ring corresponding to the distance between neutral points of adjacent poles of the field-magnets, the corresponding coils of successive cycles or sub-series of conductors being disposed in uniform precession or recession, and commutator connections corresponding to the cycles or sub-series of conducting-coils, substantially as and for the purpose specified.

2. The combination, with an annular or ring armature core, of a series of conductors or wire coils wound around the section of the ring and connected in endless or closed circuit, with the successive coils alternated or wound in opposite directions and arranged at intervals or radial spaces apart on the ring corresponding to the distances between neutral points of adjacent poles of the field-magnets, the corresponding coils of successive cycles or sub-series of conductors being disposed in uniform precession or recession over a range corresponding to two field-spaces of opposite polarity or the portions of the field included between three successive neutral points of the field, and commutator connections corresponding to the cycles or sub-series of conducting-coils, substantially as and for the purpose specified.

3. In a dynamo or motor, the combination of the brushes, the commutator composed of separate bars or segments corresponding in number to a multiple of the number of magnetic poles of the fields, an annular or ring armature core, a series of conductors or wire coils wound around the section of the ring of double the number of the commutator-segments, connections joining the coils in each cycle or sub-series at intervals corresponding to the spaces between the neutral points of the fields, the corresponding coils of successive cycles being disposed in uniform precession or recession, covering a range corresponding to two field-spaces or the intervals between three successive neutral points of the field, the successive coils throughout the circuit alternating or being wound in opposite directions, and commutator connections corresponding to the said cycles or sub-series of coils and embracing two field-spaces of opposite polarity, substantially in the manner and for the purpose specified.

4. In a dynamo or motor, the combination of the brushes, the commutator-bars connected substantially as described and corresponding in number to a multiple of the number of the poles in the field and connected under or to correspond to similar poles of the field, an annular or ring armature core, a series of conductors or wire coils wound around the section of the ring of double the number of the commutator-segments, the connections joining the coils in a closed circuit, the successive coils in which are alternated or wound in opposite directions and arranged at intervals or radial distances apart on the ring corresponding to the distances between neutral points of adjacent poles of the field-magnet, the corresponding coils of successive cycles or sub-series being disposed in uniform precession or recession, and commutator-connections corresponding in number and succession to the said cycles or sub-series of conductors, all arranged substantially in the manner and for the purpose set forth.

JOHN GEORGE POOL.

Witnesses:
FRANK E. DAVIS,
MARY E. BARNES.